(12) United States Patent
Honda et al.

(10) Patent No.: US 7,021,654 B2
(45) Date of Patent: Apr. 4, 2006

(54) SIDE AIR BAG DEVICE

(75) Inventors: Takashi Honda, Saitama (JP); Yusuke Nishida, Saitama (JP); Fumio Umezawa, Tochigi (JP)

(73) Assignees: Honda Giken Kogyo Kabushiki Kaisha, Tokyo (JP); TS Tech Co., Ltd., Asaka (JP)

( * ) Notice: Subject to any disclaimer, the term of this patent is extended or adjusted under 35 U.S.C. 154(b) by 235 days.

(21) Appl. No.: 10/615,409

(22) Filed: Jul. 8, 2003

(65) Prior Publication Data

US 2004/0075255 A1 Apr. 22, 2004

(30) Foreign Application Priority Data

Jul. 17, 2002 (JP) .............................. 2002-208691

(51) Int. Cl.
*B60R 21/22* (2006.01)

(52) U.S. Cl. .................................... 280/730.2; 297/486

(58) Field of Classification Search ............ 280/730.2, 280/730.1, 733, 743.1; 297/464, 486
See application file for complete search history.

(56) References Cited

U.S. PATENT DOCUMENTS

| 5,464,246 A | | 11/1995 | Castro et al. |
| 5,630,616 A | * | 5/1997 | McPherson ............... 280/730.2 |
| 6,029,993 A | * | 2/2000 | Mueller .................... 280/730.2 |
| 6,692,020 B1 | * | 2/2004 | Decomps et al. ........... 280/733 |

FOREIGN PATENT DOCUMENTS

JP 10129412 A * 5/1998

* cited by examiner

*Primary Examiner*—David R. Dunn
(74) *Attorney, Agent, or Firm*—Carrier, Blackman & Associates, P.C.; Joseph P. Carrier; William D. Blackman

(57) ABSTRACT

An air bag device includes an air bag which is accommodated in a folded state along sides of a seat back and a seat cushion of a seat for an occupant. Upon side collision of a vehicle, the air bag is expanded by a gas generated by an inflator and deployed between an inner surface of a side of a vehicle compartment and an occupant. The air bag is disposed outside a lap belt of a seat belt device, and hence is deployed from the sides of the seat back and the seat cushion, so that a shock-absorbing effect can be effectively exhibited.

24 Claims, 8 Drawing Sheets

“SIDE AIR BAG DEVICE

BACKGROUND OF THE INVENTION

1. Technical Field to which the Present Invention Belongs

The present invention relates to a side air bag device comprising an air bag which is accommodated in a folded state along sides of a seat back and a seat cushion of a seat for an occupant and which is adapted to be expanded by a gas generated by an inflator upon side collision of a vehicle to be deployed between an inner surface of a side of a vehicle compartment and the occupant.

2. Discussion of Relevant Art

A conventional side air bag device is known, for example, from U.S. Pat. No. 5,464,246. An air bag of this side air bag device is formed cylindrically and adapted to be deployed to connect an upper end of a seat back and a front end of a seat cushion, thereby restraining from a side of the breast to a side of the waist of an occupant.

When both a side air bag device and a seat belt device are mounted in a seat, if the air-bag is deployed to connect an upper end of a seat back and a front end of a seat cushion, there is a possibility that the air bag is sandwiched between an occupant and a lap belt disposed to restrain the waist and the abdomen of an occupant, whereby the smooth deployment of the air bag is obstructed and a shock-absorbing effect cannot be effectively exhibited.

SUMMARY OF THE INVENTION

The present invention has been accomplished with such circumstance in view, and it is an object of the present invention to prevent the deployment of the air bag of the side air bag device from being obstructed by the interference of the air bag with the lap belt of the seat belt device.

To achieve the above object, according to an aspect of the present invention, there is proposed an air bag device comprising an air bag which is accommodated in a folded state along sides of a seat back and a seat cushion of a seat for an occupant and which is adapted to be expanded by a gas generated by an inflator upon side collision of a vehicle to be deployed between an inner surface of a side of a vehicle compartment and the occupant, wherein the air bag is disposed outside a lap belt of a seat belt device provided with the seat.

With the above arrangement, the air bag of the air bag device is disposed outside the lap belt of the seat belt device, and hence the air bag can be deployed from the sides of the seat back and the seat cushion without interfering with the lap belt, so that a shock-absorbing effect can be effectively exhibited.

A front seat 11 in each embodiment corresponds to the seat in the present invention.

Other objects, advantages and salient features of the invention will be apparent from the following detailed description which, in conjunction with the annexed drawings, discloses the present embodiments of the invention.

DETAILED DESCRIPTION THE INVENTION

Figure 1:
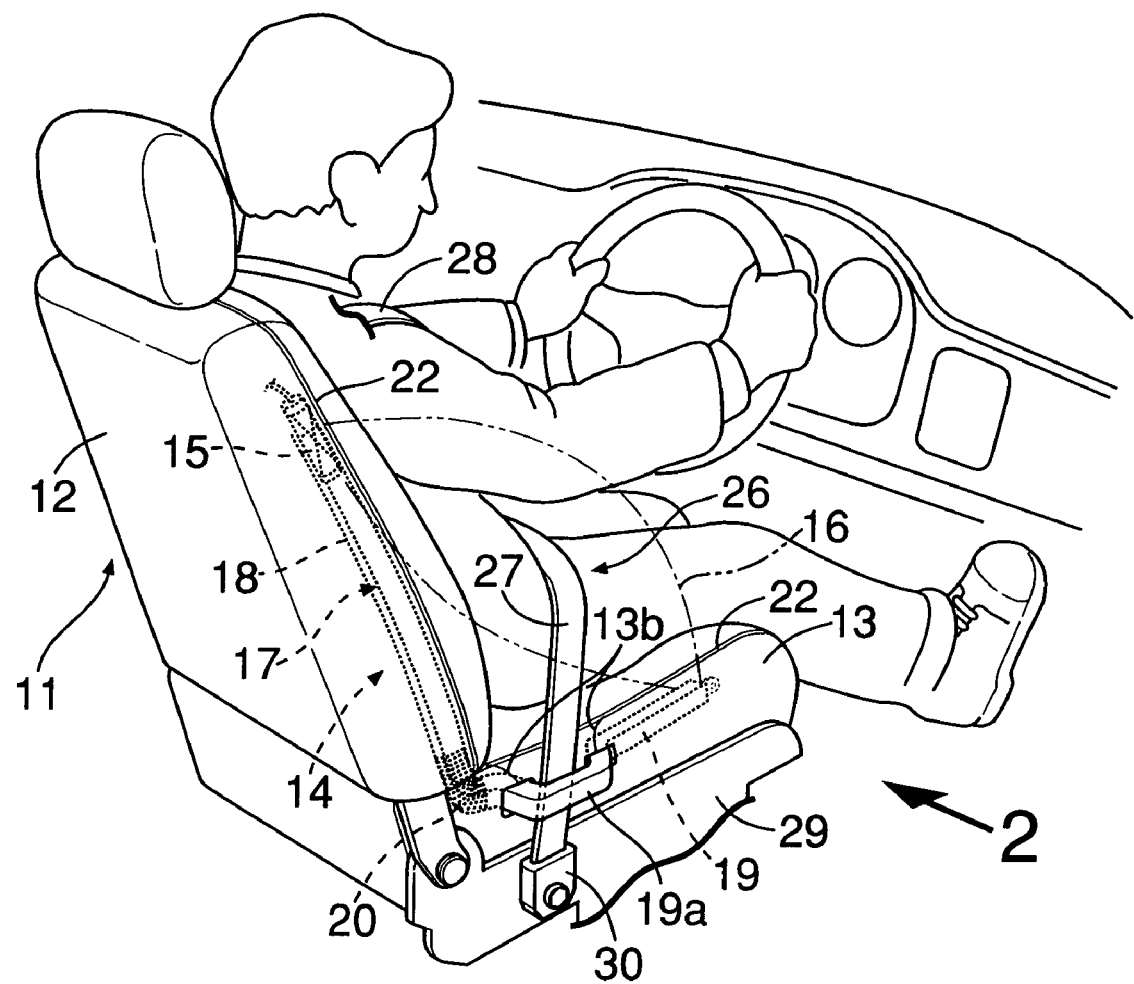
FIG. 1 is a perspective view of a front seat equipped with a side air bag device according to a first embodiment of the invention.
Figure 2:
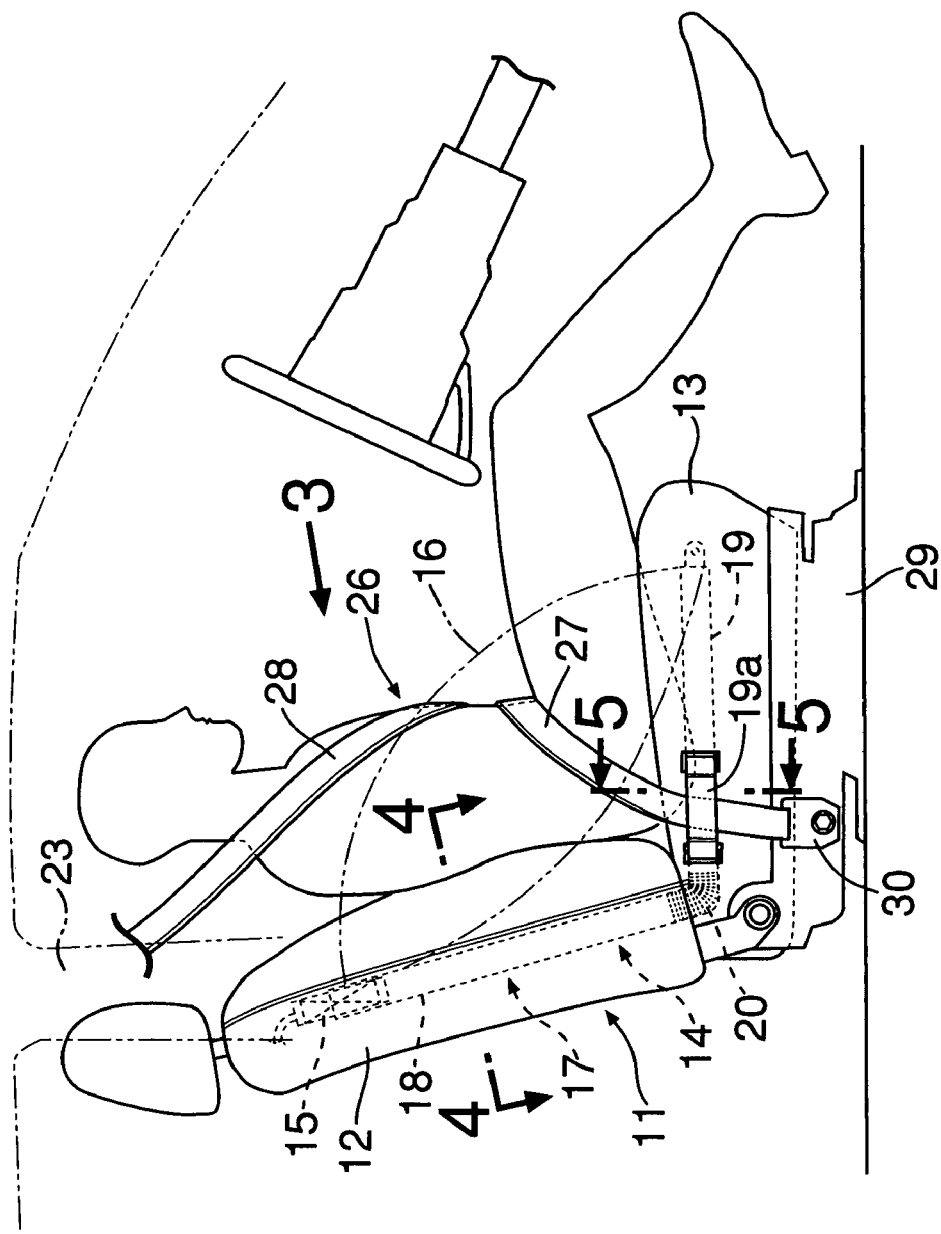
FIG. 2 is a view taken in a direction of an arrow 2 in FIG. 1.
Figure 3:
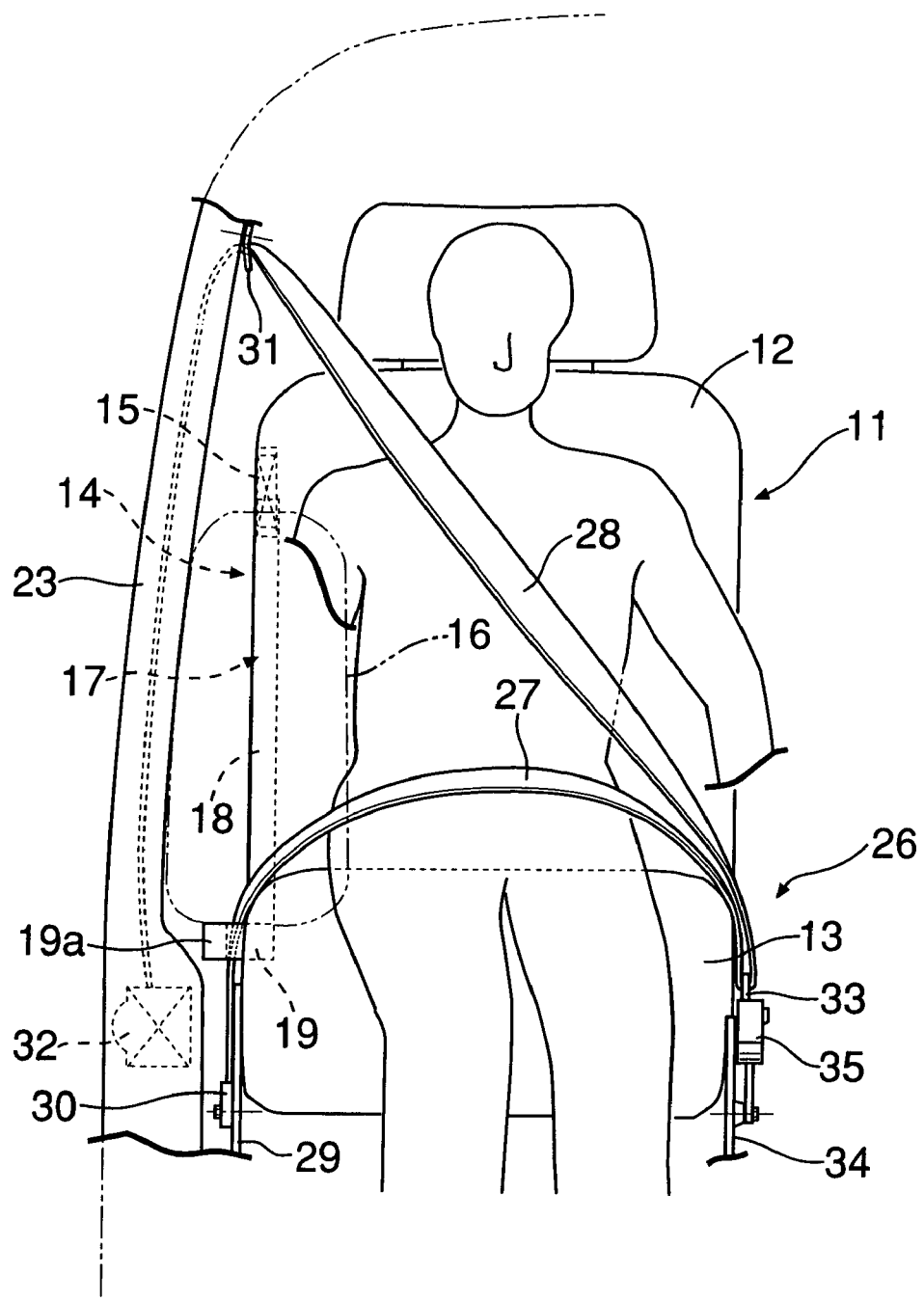
FIG. 3 is a view taken in a direction of an arrow 3 in FIG. 2.
Figure 4:
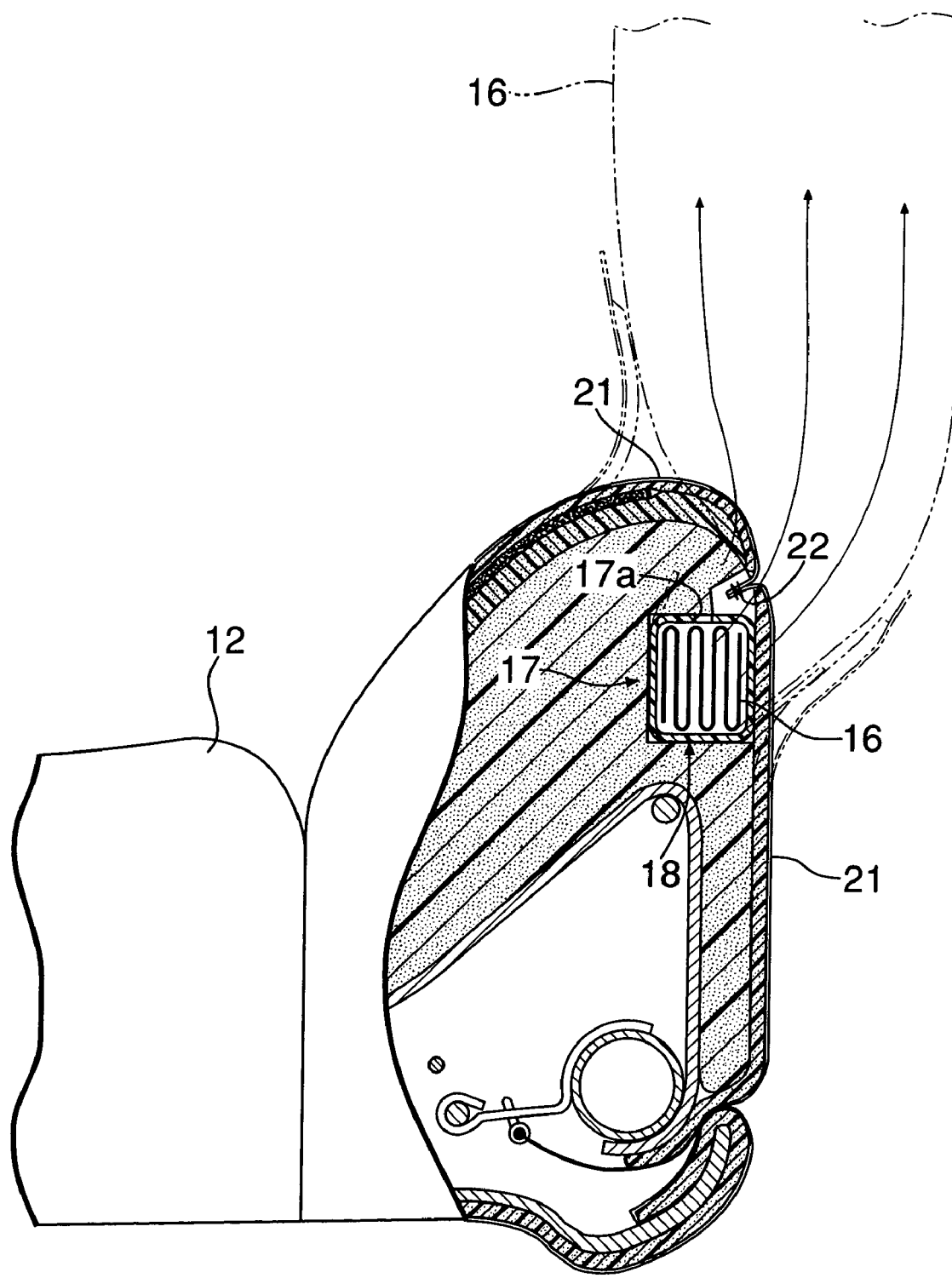
FIG. 4 is an enlarged sectional view taken along a line 4—4 in FIG. 2.
Figure 5:
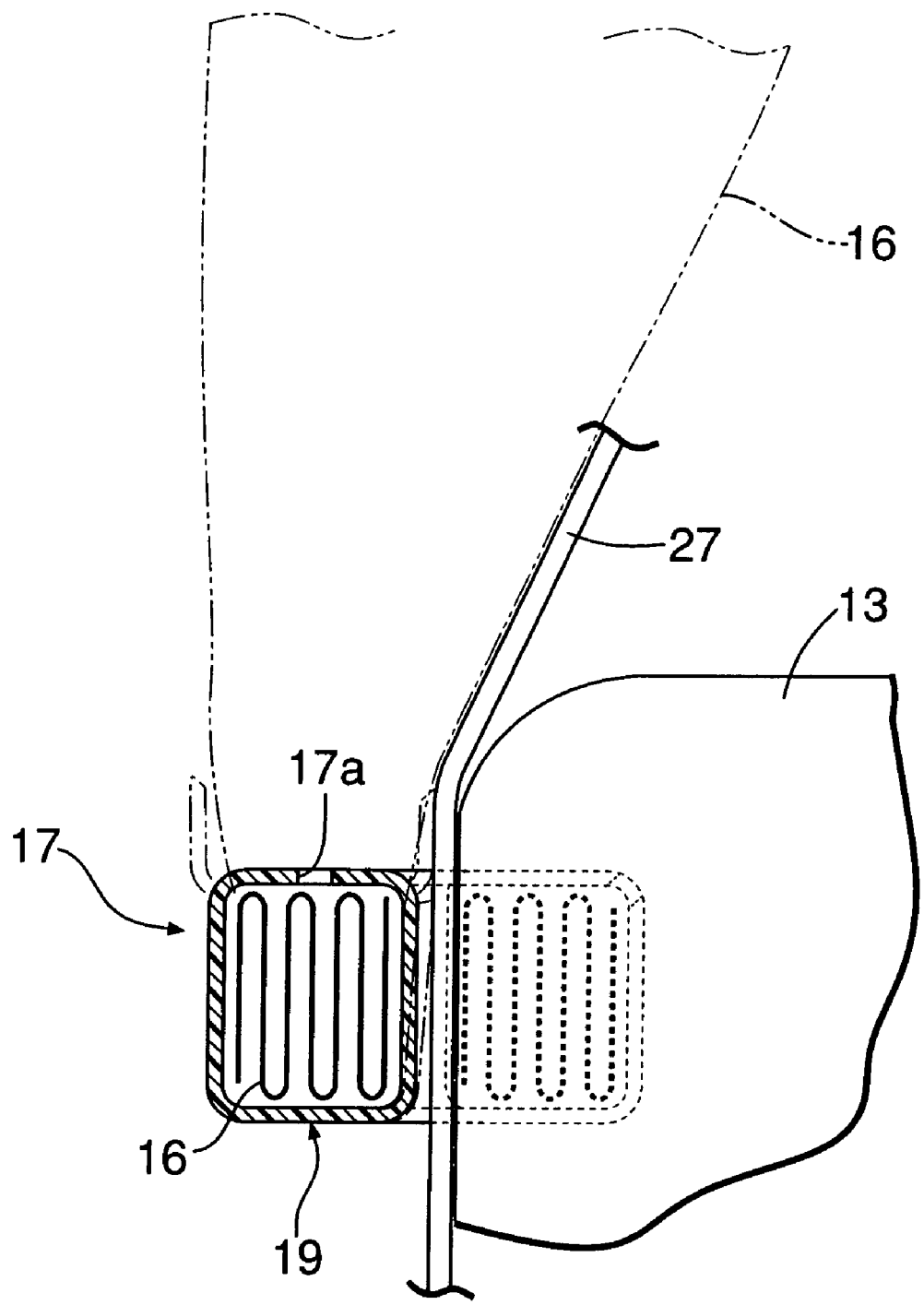
FIG. 5 is an enlarged sectional view taken along a line 5—5 in FIG. 2.
Figure 6:
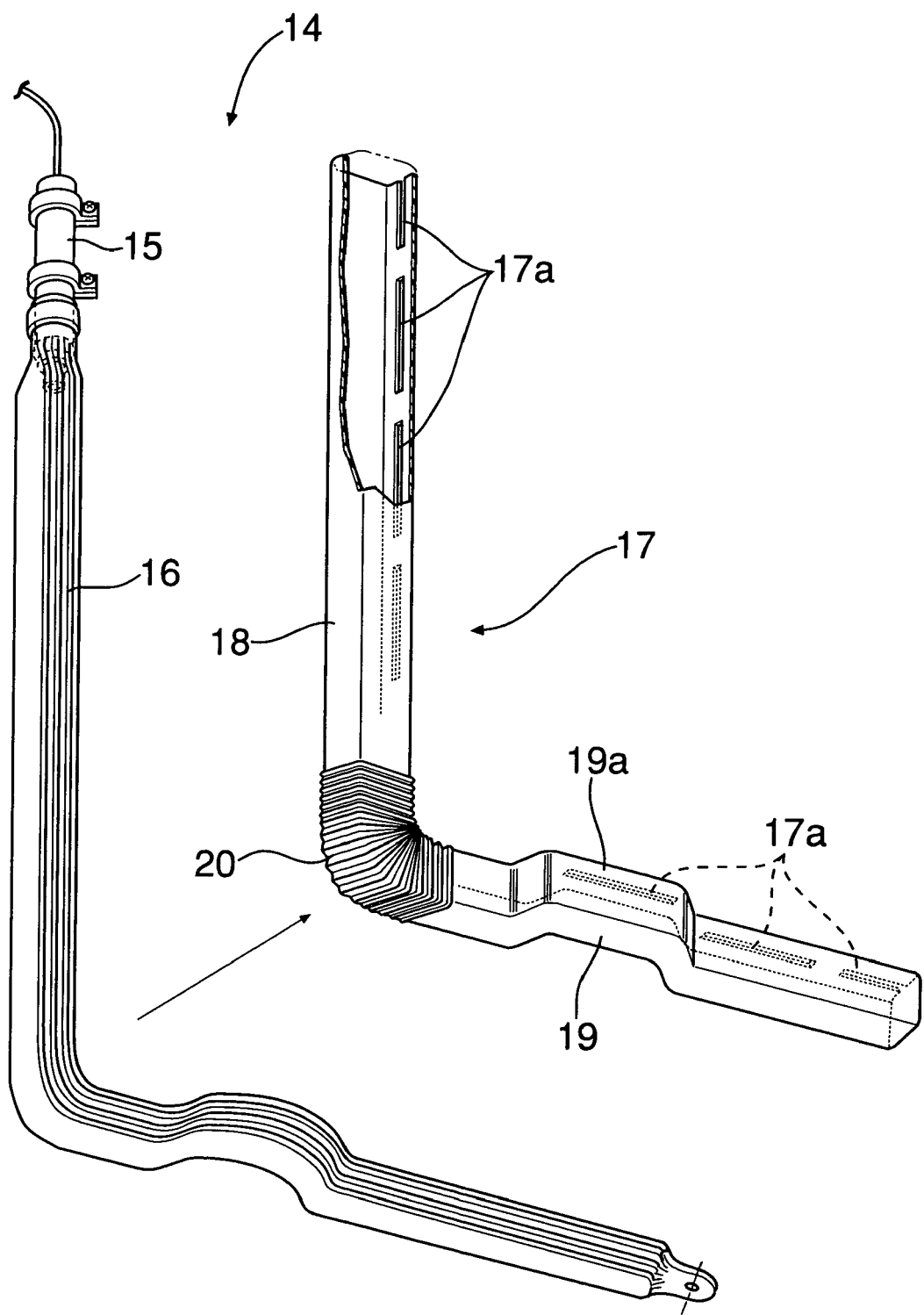
FIG. 6 is an exploded perspective view of an air bag module in FIG. 1.

Modes for carrying out the present invention will now be described by way of embodiments of the present invention with reference to the accompanying drawings.

FIGS. 1 to 6 show a first embodiment of the present invention.

A side air bag device is disposed along a right side of a front seat 11 of an automobile, namely, along a face opposed to a front door or a center pillar. The side air bag device includes an air bag module 14 embedded in right sides of a seat back 12 and seat cushion 13. The air bag module 14 comprises: an inflator 15 adapted to generate a high-pressure gas; an air bag 16 adapted to be expanded by the gas generated by the inflator 15 to be deployed to connect an upper end of the seat back 12 and a front end of the seat cushion 13; and an air bag cover 17 in which the air bag 16 in a folded state is accommodated. The air bag cover 17 formed cylindrically from a thin synthetic resin includes: a first accommodating portion 18 embedded in the seat back 12; a second accommodating portion 19 embedded in the seat cushion 13; and a bellows portion 20 which connects the first accommodating portion 18 and the second accommodating portion 19 to each other and which is capable of being bent during reclining. Slits 17a for breaking the air bag cover 17 in a lengthwise direction are formed in the first and second accommodating portions 18 and 19 and the bellows portion 20.

The air bag cover 17 of the above-described structure is embedded inside sewn portions 22 of skins 21, 21 of the seat back 12 and the seat cushion 13. A protrusion 19a is formed on the second accommodating portion 19 of the air bag cover 17 in the vicinity of the bellows portion 20, and exposed to the outside from a side of the seat cushion 13. Tear lines 13b liable to be broken are formed on the seat cushion 13 to connect the sewn portions 22 of the skins 21, 21 of the seat cushion 13 to edges surrounding the protrusion 19a of the air bag cover 17. The tear lines 13b may be formed by partially thinning the skin 21 of the seat cushion 13, by making perforations, or by sewing the seat cushion 13 by an easily breakable thread.

A seat belt device 26 includes a lap belt 27 for restraining the abdomen of an occupant, and a shoulder belt 28 for restraining the breast of the occupant. The lap belt 27 is fixed at one end to a lap belt anchor 30 mounted on one of seat frames 29. One end of the shoulder belt 28 is slidably passed through a slip ring 31 mounted at an upper portion of the center pillar 23, and is wound around a retractor 32 mounted at a lower portion of the center pillar 23. A tongue 33, through which the other ends of the lap belt 27 and the shoulder belt 28 are slidably passed, is detachably locked on a buckle 35 mounted on the other seat frame 34. The one end of the lap belt 27 extending from the lap belt anchor 30 is passed upwards from below through a gap between the seat cushion 13 and the protrusion 19a of the air bag cover 17 protruding outwards from the seat cushion 13. Through such construction, the folded air bag 16 is disposed outside the lap belt 27, or in other words, no portion of the air bag 16 is disposed between the occupant and the lap belt.

When an acceleration equal to or higher than a predetermined value is detected as a result of side collision of a vehicle including the side air bag device of the above-described structure, the air bag 16 supplied with the high-pressure gas generated by the inflator 15 is expanded within the air bag cover 17, and the resultant pressure breaks the air bag cover 17 along the slits 17a. Further, the sewn portions 22 of the skins 21, 21 of the front seat 11 and the tear lines 13b are broken, and the resultant openings allow the air bag 16 to deploy while connecting the upper end of the seat back 12 to the front end of the seat cushion 13, thereby restraining the right side of an occupant to protect the occupant from a shock resulting from the side collision. At this time, the lap belt 27 extending vertically from the lap belt anchor 30 of the seat belt device 26 is in abutment against the right part of waist of the occupant, but the protrusion 19a of the air bag cover 17 accommodating the air bag 16 in this area detours around outside the lap belt 27. Therefore, the air bag 16 is prevented from deploying between the lap belt 27 and the occupant, that is, the air bag 16 reliably deploys while avoiding the interference with lap belt 27.

Figure 7:
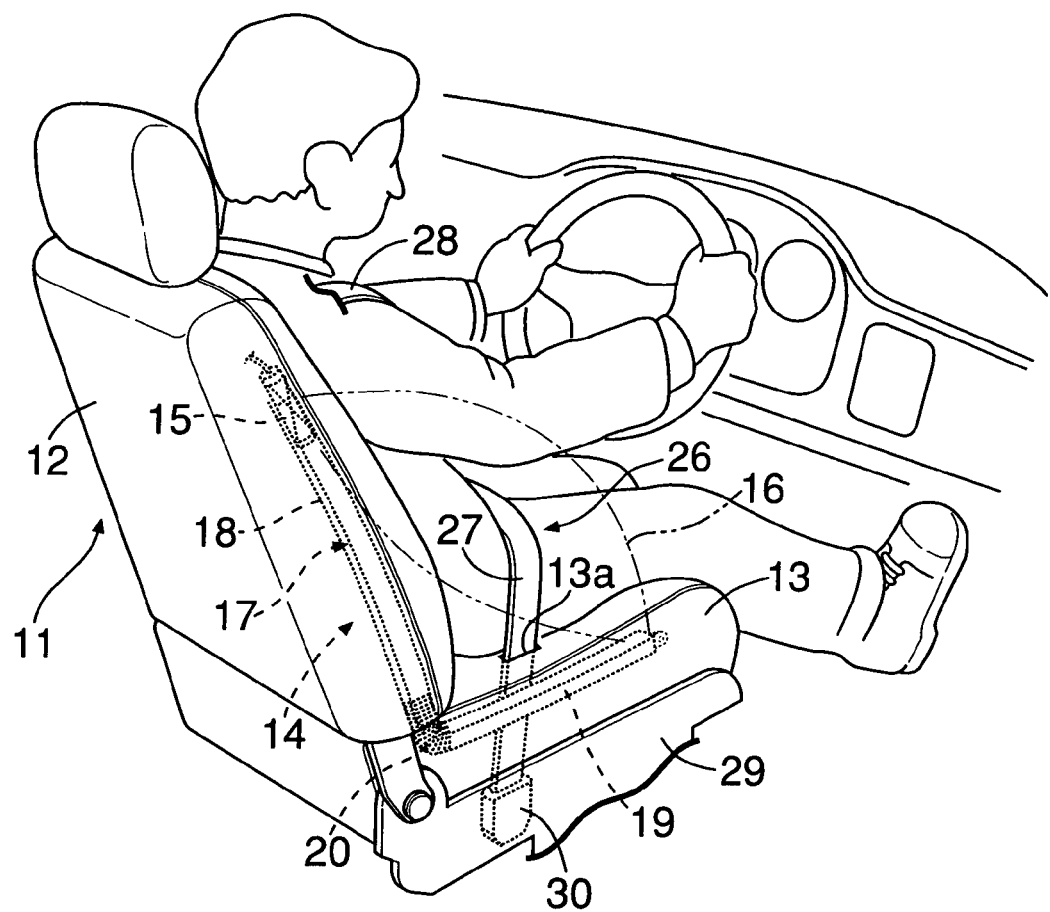
FIG. 7 is a view similar to FIG. 1, but according to a second embodiment of the present invention.

A second embodiment of the present invention will now be described with reference to FIG. 7.

In the first embodiment, the lap belt 27 is disposed outside the lap belt 27 in such a manner that the protrusion 19a provided on the second accommodating portion 19 of the air bag cover 17 detours around the outside the lap belt 27. In the second embodiment, however, a second accommodating portion 19 of an air bag cover 17 is formed rectilinearly, the entire air bag module is embedded in the seat cushion, 13, and the lap belt 27 is guided to above the seat cushion 13 through a lap belt-insertion bore 13a formed in the seat cushion 13 at a location inside the second accommodating portion 19.

Also according to the second embodiment, the air bag 16 is disposed outside the lap belt 27 to be reliably deployed while avoiding the interference with the lap belt 27.

Figure 8:
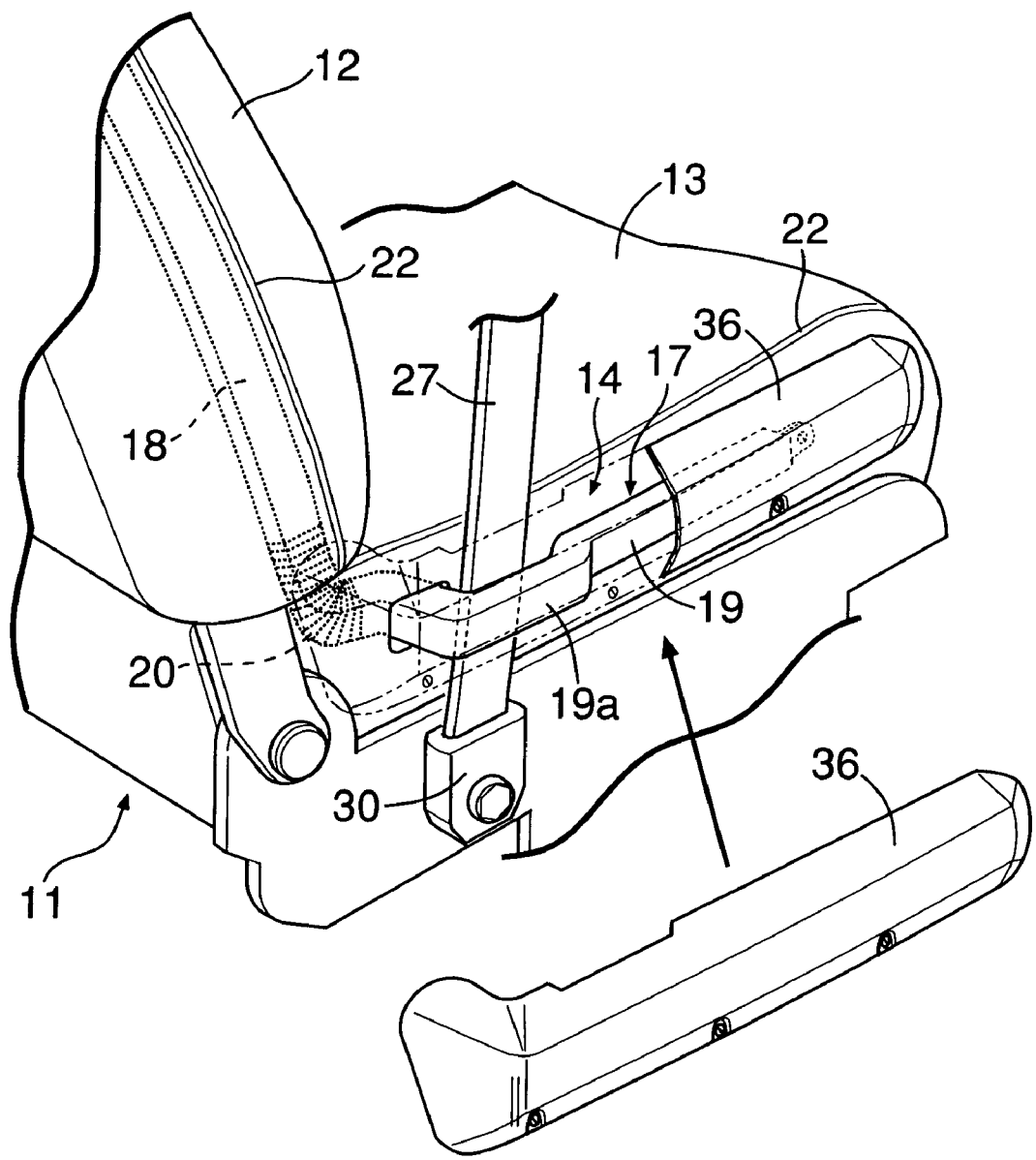
FIG. 8 is a view similar to FIG. 1, but according to a third embodiment of the present invention.

A third embodiment of the present invention will now be described with reference to FIG. 8.

The third embodiment is an improvement of the first embodiment. In the third embodiment, the second accommodating portion 19 of the air bag cover 17 is partially exposed from a right side of the seat cushion 13 at the protrusion 19a rather than being embedded in the seat cushion 13, and, as in the first embodiment, one end of the lap belt 27 is passed upwards from below through the gap between the protrusion 19a of the air bag cover 17 protruding outwards and the seat cushion 13. A cover 36 for covering a reclining mechanism (not shown) provided on a right side of the seat cushion 13 covers the second accommodating portion 19 of the air bag cover 17.

Therefore, when the air bag 16 is expanded so that the air bag cover 17 is broken along the slits 17a (see FIGS. 4–5), a portion of the air bag 16 within the first accommodating portion 18 is deployed while breaking the sewn portion 22 of the seat back 12, but a portion of the air bag within the second accommodating portion 19 is deployed from a gap between the side of the seat cushion 13 and the cover 36 for the reclining mechanism. According to the third embodiment, the protrusion 19a of the air bag cover 17 is completely covered with the cover 36 so as to be invisible from outside, leading to an improvement in appearance.

Although the embodiments of the present invention have been described in detail, it will be understood that various modifications may be made without departing from the subject matter of the present invention.

For example, in the third embodiment, the air bag 16 may be deployed from the opening of a tear line formed in the cover 36 due to the pressure caused by the expansion of the air bag 16, rather than deploying the air bag 16 from the gap between the side of the seat cushion 13 and the cover 36 of the reclining mechanism.

As discussed above, according to the present invention, the air bag of the air bag device is disposed outside the lap belt of the seat belt device, and hence the air bag can be deployed from the sides of the seat back and the seat cushion without interfering with the lap belt, so that a shock-absorbing effect can be effectively exhibited.

What is claimed is:

1. An air bag device comprising: an air bag which is accommodated in a folded state along sides of a seat back and a seat cushion of a seat for an occupant and which is adapted to be expanded by a gas generated by an inflator upon side collision of a vehicle to be deployed between an inner surface of a side of a vehicle compartment and the occupant,
wherein the air bag comprises a protruding portion, the protruding portion including multiple bends and extending outward from a side of a seat cushion so that the protruding portion is disposed outside a lap belt of a seat belt device provided with the seat.

2. An air bag device according to claim 1, further including an air bag cover enclosing said air bag in the folded state, said air bag and said air bag cover are disposed at least partially within said seat.

3. An air bag device according to claim 2, wherein said air bag cover includes a protrusion at a location corresponding to said protruding portion of the airbag, the protrusion disposed outside of said seat and enclosing a portion of said air bag, said lap belt extends between said protrusion and said seat.

4. An air bag device according to claim 3, further including a cover disposed over said protrusion.

5. An air bag device according to claim 3, wherein the protrusion is substantially U-shaped so as to comprise a pair of parallel leg portions connected at one end by a base portion, wherein the leg portions extend generally horizontally outward from said side of the seat cushion, and wherein the lap belt extends within an opening provided between said side of the seat cushion, said leg portions, and said base portion.

6. An air bag device according to claim 2, wherein said lap belt extends between said air bag cover and the occupant.

7. An air bag device according to claim 2, wherein a vertically extending portion of said lap belt is disposed between said air bag cover and the occupant.

8. An air bag device according to claim 2, wherein said air bag cover includes a first portion embedded in the seat back, a second portion embedded in the seat cushion, and a flexible portion connecting the first and second portions.

9. An air bag device according to claim 1, further including an air bag cover enclosing said air bag in the folded state, said air bag and said air bag cover are disposed within said seat.

10. An air bag device according to claim 9, wherein a bore is formed through said seat cushion inwardly of said air bag cover, said lap belt extends through said bore.

11. An air bag device according to claim 1, wherein when said air bag is deployed it connects an upper end of said seat back and a front end of the seat cushion.

12. An airbag device according to claim 1, wherein the airbag further comprises a transition portion, the transition portion comprising a portion of the airbag which extends between the seat back and the seat cushion, the transition portion being spaced apart from the protruding portion.

13. An air bag device comprising:
- an air bag which is accommodated in a folded state along sides of a seat back and a seat cushion of a seat for an occupant of a vehicle;
- an inflator which generates a gas to the air bag upon side collision of the vehicle to be deployed between an inner surface of a side of a vehicle compartment and the occupant,
- wherein the air bag comprises a protruding portion, the protruding portion including multiple bends and extending outward from a side of a seat cushion so that the protruding portion is disposed outside a lap belt of a seat belt device provided with the seat such that no portion of the air bag is between the lap belt and the occupant.

14. An air bag device according to claim 13, further including an air bag cover enclosing said air bag in the folded state, said air bag and said air bag cover are disposed at least partially within said seat.

15. An air bag device according to claim 14, wherein said air bag cover includes a protrusion at a location corresponding to the protruding portion of the airbag, the protrusion disposed outside of said seat and enclosing a portion of said air bag, said lap belt extends between said protrusion and said seat.

16. An air bag device according to claim 15, further including a cover disposed over said protrusion.

17. An air bag device according to claim 13, wherein the protrusion is substantially U-shaped so as to comprise a pair of parallel leg portions connected at one end by a base portion, wherein the leg portions extend generally horizontally outward from said side of the seat cushion, and wherein the lap belt extends within an opening provided between said side of the seat cushion, said leg portions, and said base portion.

18. An air bag device according to claim 14, wherein said lap belt extends between said air bag cover and the occupant.

19. An air bag device according to claim 14, wherein a vertically extending portion of said lap belt is disposed between said air bag cover and the occupant.

20. An air bag device according to claim 14, wherein said air bag cover includes a first portion embedded in the seat back, a second portion embedded in the seat cushion, and a flexible portion connecting the first and second portions.

21. An air bag device according to claim 13, further including an air bag cover enclosing said air bag in the folded state, said air bag and said air bag cover are disposed within said seat.

22. An air bag device according to claim 21, wherein a bore is formed through said seat cushion inwardly of said air bag cover, said lap belt extends through said bore.

23. An air bag device according to claim 13, wherein when said air bag is deployed it connects an upper end of said scat back and a front end of the seat cushion.

24. An airbag device according to claim 11, wherein the airbag further comprises a transition portion, the transition portion comprising a portion of the airbag which extends between the seat back and the seat cushion, the transition portion being spaced apart from the protruding portion.

* * * * *